United States Patent [19]
Cox et al.

[11] Patent Number: 5,907,845
[45] Date of Patent: *May 25, 1999

[54] METHOD AND SYSTEM FOR ORGANIZING ON-LINE BOOKS USING BOOKCASES

[75] Inventors: Paula J. Cox; Dana L. Gillihan, both of Raleigh; Donald Ray Hyatt, Apex; Paul T. Leone, Raleigh; Kenneth M. Nordby, Cary; Victor Edward Pullizzi, Holly Springs; Thyra Lynne Rauch, Raleigh; Robert W. Rinda, Raleigh, all of N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,854

[22] Filed: Jul. 26, 1996

[51] Int. Cl.⁶ ........................................................ G06F 17/30
[52] U.S. Cl. ........................... 707/102; 707/10; 707/103; 707/104
[58] Field of Search ..................... 375/612, 610, 375/614; 707/10, 100, 102, 104, 200, 103

[56] References Cited

U.S. PATENT DOCUMENTS

| | | | |
|---|---|---|---|
| 5,367,621 | 11/1994 | Cohen et al. | 395/154 |
| 5,369,778 | 11/1994 | San Soucie et al. | 395/800 |
| 5,410,688 | 4/1995 | Williams et al. | 395/600 |
| 5,564,043 | 10/1996 | Siefert | 395/600 |
| 5,608,900 | 3/1997 | Dockter et al. | 395/613 |
| 5,611,076 | 3/1997 | Durflinger et al. | 395/613 |
| 5,615,367 | 3/1997 | Bennett et al. | 395/613 |
| 5,625,809 | 4/1997 | Dysart et al. | 395/614 |
| 5,628,007 | 5/1997 | Nevarez | 395/612 |
| 5,630,125 | 5/1997 | Zellweger | 395/614 |
| 5,634,124 | 5/1997 | Khoyi et al. | 395/614 |
| 5,699,526 | 12/1997 | Siefert | 395/227 |
| 5,721,906 | 2/1998 | Siefert | 395/609 |
| 5,778,366 | 7/1998 | Gillihan et al. | 707/9 |

FOREIGN PATENT DOCUMENTS

| | | | |
|---|---|---|---|
| 7-230477 | 8/1995 | Japan | G06F 17/30 |

OTHER PUBLICATIONS

Tani et al. "User Interfaces for Information Strolling on a Digital Library"proceedings of ISDL '95, pp. 167–174.

Chang, "Extending Visual Languages for Multimedia", IEEE Multimedia, 1996.

Gillihan et al., "Information Access:Single Source, Multiple Use," SigDoc 1996.

Kikuchi et al., "User Interface for a Digital Library to Support Construction of a 'Virtual Personal Library'," Proceedings of Multimedia '96.

D'Alessandro et al., "The Iowa Health Book: Creating, Organizing and Distributing a Digital Medical Library of Multimedia Consumer Health Information on the Internet to Improve Rural Health Care by Increasing Rural Patient Access to Information," Proceedi.

Dieberger, "Browsing the WWW by Interacting with a textual virtual environment—A framework for experimenting with navigational methaphors" Hypertext, Mar. 1996.

Gerhardt D. Etal: "Computer Aided Medical Education", Proceedings of the annual conference of the Engineering in Medicine and Biology Society, Philadelphia, Nov. 1–4, 1990. vol. 12, pp. 1248–1249.

"On–Screen Bookshelf for PC Office Systems", IBM Technical Disclosure Bulletin, vol. 32, No. 6A, Nov., 1989, NY, pp. 266–267.

"Dynamic, Scrollable, Area Sensitive Container Icons."IBM Technical Disclosure Bulletin, vol. 35, No. 7, Dec. 1992, New York, pp. 474–475.

"Graphic Office Interface", IBM Technicle Disclosure Bulletin, vol. 34, No. 1, Jun. 1991, New York, pp. 266–269.

*Primary Examiner*—Paul V. Kulik
*Assistant Examiner*—Michael J. Wallace, Jr.
*Attorney, Agent, or Firm*—A. Bruce Clay; Timothy J. O'Sullivan

[57] ABSTRACT

On-line electronic books are stored in remote storage devices and accessible through a server or other type of interface device. A bookcase is created and stored in a local storage device. Appropriate electronic links are supplied in order to access an electronic book from the bookcase. The bookcase provides a library metaphor that allows a user to organize the online books in a manner that has meaning and utility to the user.

9 Claims, 9 Drawing Sheets

FIG. 2

| | List of Bookcases | | |
|---|---|---|---|
| File View Options Window Help | | | |
| | Name | Date | Title |
| | Vicstuff | 2/9/95 1:34:00PM | My own private collection |
| | Bookmgr | 2/9/95 1:34:00PM | Some really cool books |
| | 009-099 | 9/11/95 2:11:33PM | many subjects (general works) |
| | 100-199 | 9/11/95 2:11:33PM | man's ideas (philosophy) |
| | 200-299 | 8/3/94 10:40:06AM | religion |
| | 300-399 | 4/5/95 10:58:29AM | people in groups (social sciences) |
| | 400-499 | 4/5/95 9:49:27AM | language |
| | 500-599 | 6/28/92 6:37:45PM | science |
| | 600-699 | 1/17/96 8:55:03PM | uses of science (technology) |
| For Help press F1 | | | Total Bookcases |

100, 104, 106, 102

METHOD AND SYSTEM FOR ORGANIZING ON-LINE BOOKS USING BOOKCASES

FIELD OF THE INVENTION

This invention relates in general to computer software, and in particular to a method and system for organizing on-line softcopy books using bookcases.

BACKGROUND OF THE INVENTION

As a result of the proliferation of computer systems including LANs and the Internet, individuals as well as organizations transfer, store, and utilize many on-line electronic documents. The past several years has seen dramatic growth towards the use of the Internet/Intranet as a medium for electronic publishing. On-line documents can quickly become overwhelming in volume and variety to a user. As a result, software products such as IBM's BookManager have been made available to assist users in building on-line documents into books, and organizing those books into a virtual library using bookcases and collections. When books are built, they are compressed and indexed for rapid searching. Due to such products, the ability to search electronically for needed information has become one important advantage of an on-line book over a hardcopy book.

Many search engines have been devised to assist in searching for needed information. However, in an on-line book system if you do not know which book contains the desired information, or if you are looking for a particular book, but do not recall its name, a user may require additional help. For example, CD-ROM's are distributed on a quarterly basis for the IBM MVS collection kit. Each new kit may contain thousands of electronic books that when added to previous versions, can be overwhelming. Thus, unless the exact title is remembered, a user may have to look through each title to find the required one. Thus, there is a need for a user interface that allows the organization of on-line books into a more user friendly format, which is optionally done by either the documents provider, or by the user of the documents.

SUMMARY OF THE INVENTION

The present invention provides an extension of a physical library metaphor to an online "virtual" library. While the actual books may be stored in many separate and distinct locations, i.e., a plurality of remote servers or mainframes, the bookcase provides a familiar classification system to help a user find the desired information.

The creation of a bookcase in which the titles of books, bookshelves and or bookcases involves the creation of appropriate links to the actual online book/bookshelf/bookcase. Thus, without greatly increasing local storage requirements, a user can quickly and easily create a bookcase that makes his/her work simpler.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 2 is a graphical representation of a list of bookcases in accordance with the present invention;

DETAILED DESCRIPTION OF THE INVENTION

Figure 1:
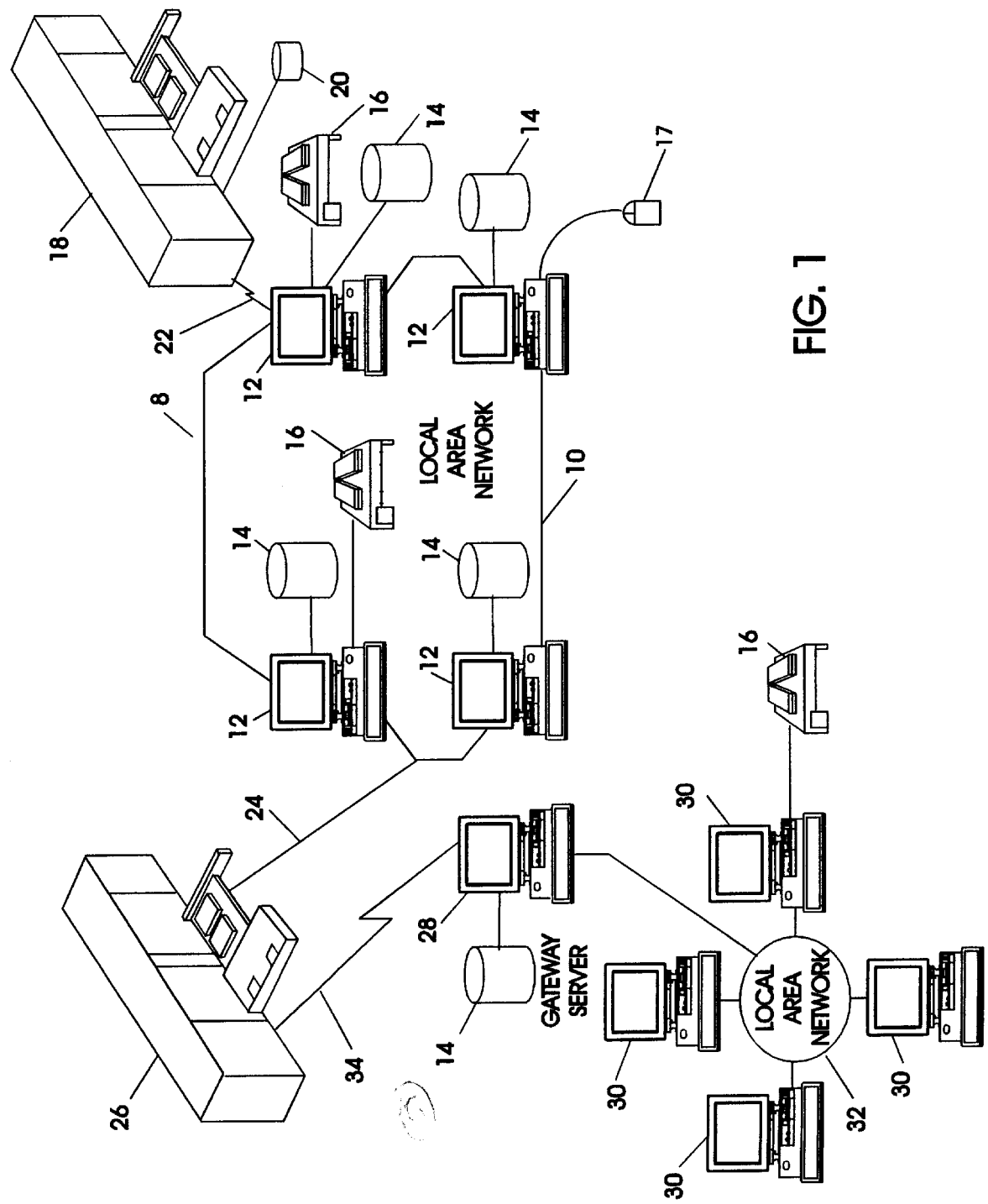
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects maybe stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Referring to FIG. 2, a graphical representation of a list 100 of bookcases in accordance with the present invention is shown as it may appear on a computer monitor. Each bookcase, for example, book manager bookcase 102, is identified by a name and title. The title, for example, "Some Really Cool Books" 104 for the BookManager bookcase 102 is meant to serve as a simple identification for the contents of the bookcase. As is typical, an icon, such as icon 106, is provided to allow selection of an individual bookcase. It is important to note that the actual books do not reside in the bookcase, rather the links necessary to locate and present the book are stored with the bookcase.

Figure 3:
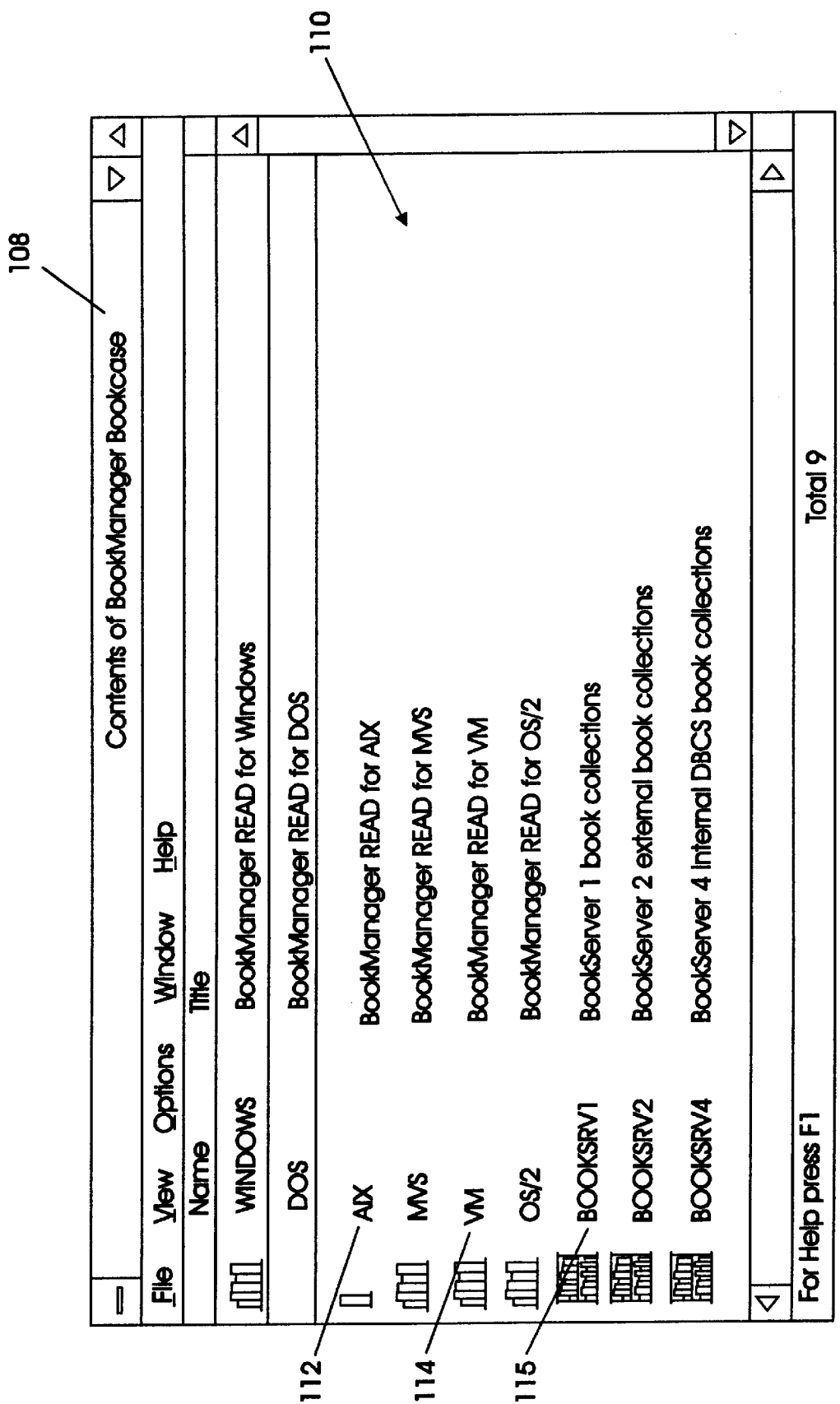
FIG. 3 is a graphical representation of a bookcase in accordance with the present invention.

Referring to FIG. 3, it can be seen from the title bar 108 that the BookManager bookcase 102 has been selected from FIG. 2. Shown within window 110 are the listings within the BookManager bookcase 102, including a plurality of individual books such as AIX book 112, bookshelves such as VM bookshelf 114, or bookcases such as BOOKSRV1 bookcase 115, as will be described more fully below.

Figure 4:
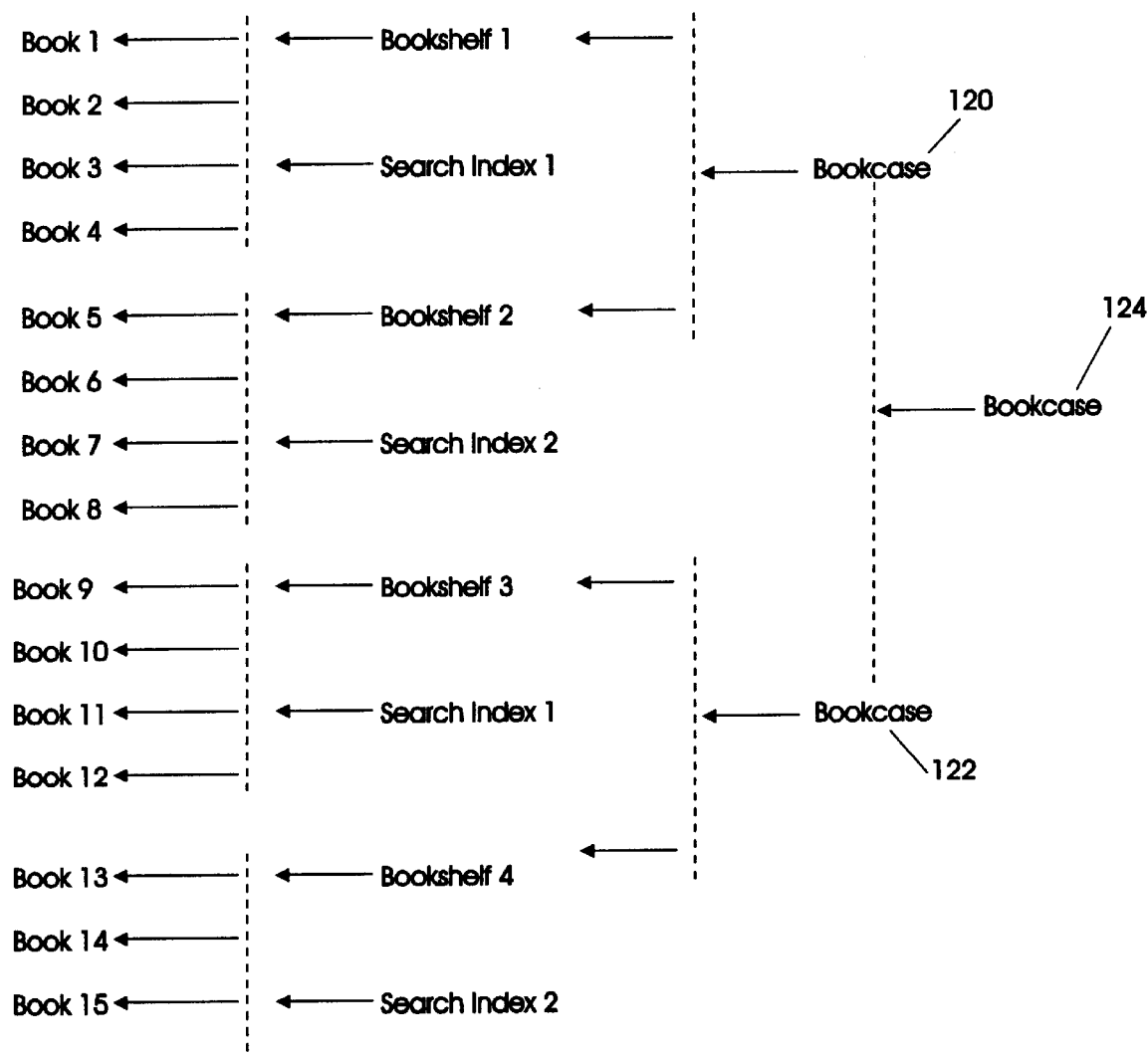
FIG. 4 is a diagram illustrating organization of books into bookcases.

Referring to FIG. 4, an example configuration of books, bookshelves, and bookcases is shown. As shown, there are three bookcases indicated by reference numerals 120, 122 and 124. Bookcase 124 is comprised of bookcase 120 and bookcase 122. Bookcase 120 is comprised of bookshelf 1 having a search index 1 and bookshelf 2 having a search index 2. Similarly, bookshelf 1 is comprised of book 1, book 2, book 3, and book 4. Bookshelf 2 is comprised of book 5, book 6, book 7, and book 8. Bookcase 122 is similarly arranged. Thus, it can be seen that a hierarchy of arrangements can be provided depending on individual need. This gives the on-line library system an arrangement similar to a real library, which is comprised of a plurality of bookcases, each having a plurality of shelves and books thereon. Furthermore, as in a real library, the user can reorganize and re-categorize the books as needed. Unlike a real library, however, books can appear in multiple bookcases as desired.

Figure 5:
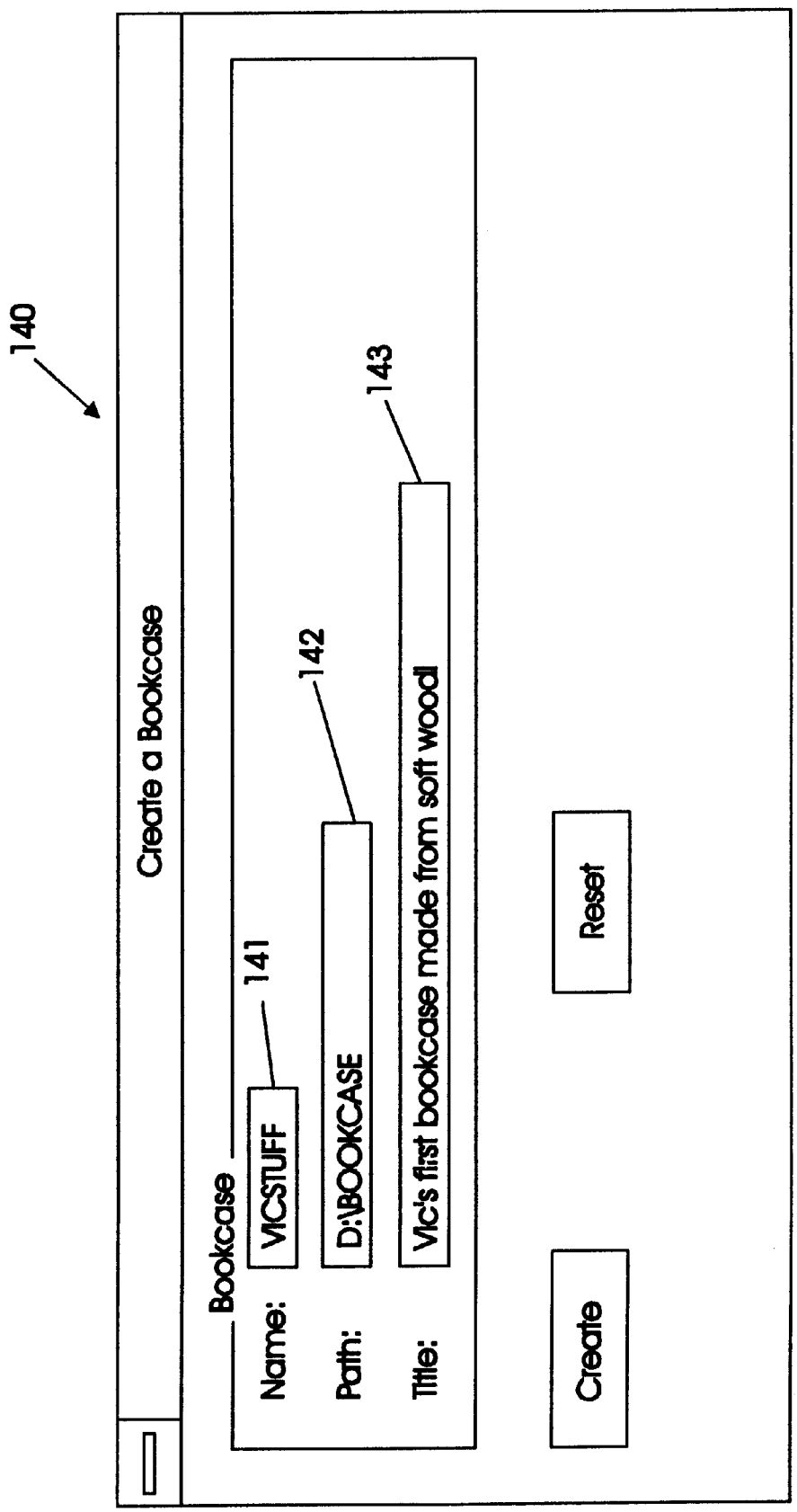
FIG. 5 is an illustration of a dialogue box for creating a bookcase.

Referring to FIG. 5, a "Create a Bookcase" dialog box 140 is shown. A user is prompted to add a name, for example VICSTUFF, in a field 141 for the bookcase; a path where the bookcase will be located, for example D:\BOOKCASE, in a field 142; and a title, for example "Vic's First Bookcase Made from Soft Wood!", in a field 143 to help the user recall what is placed into that bookcase.

Figure 6:
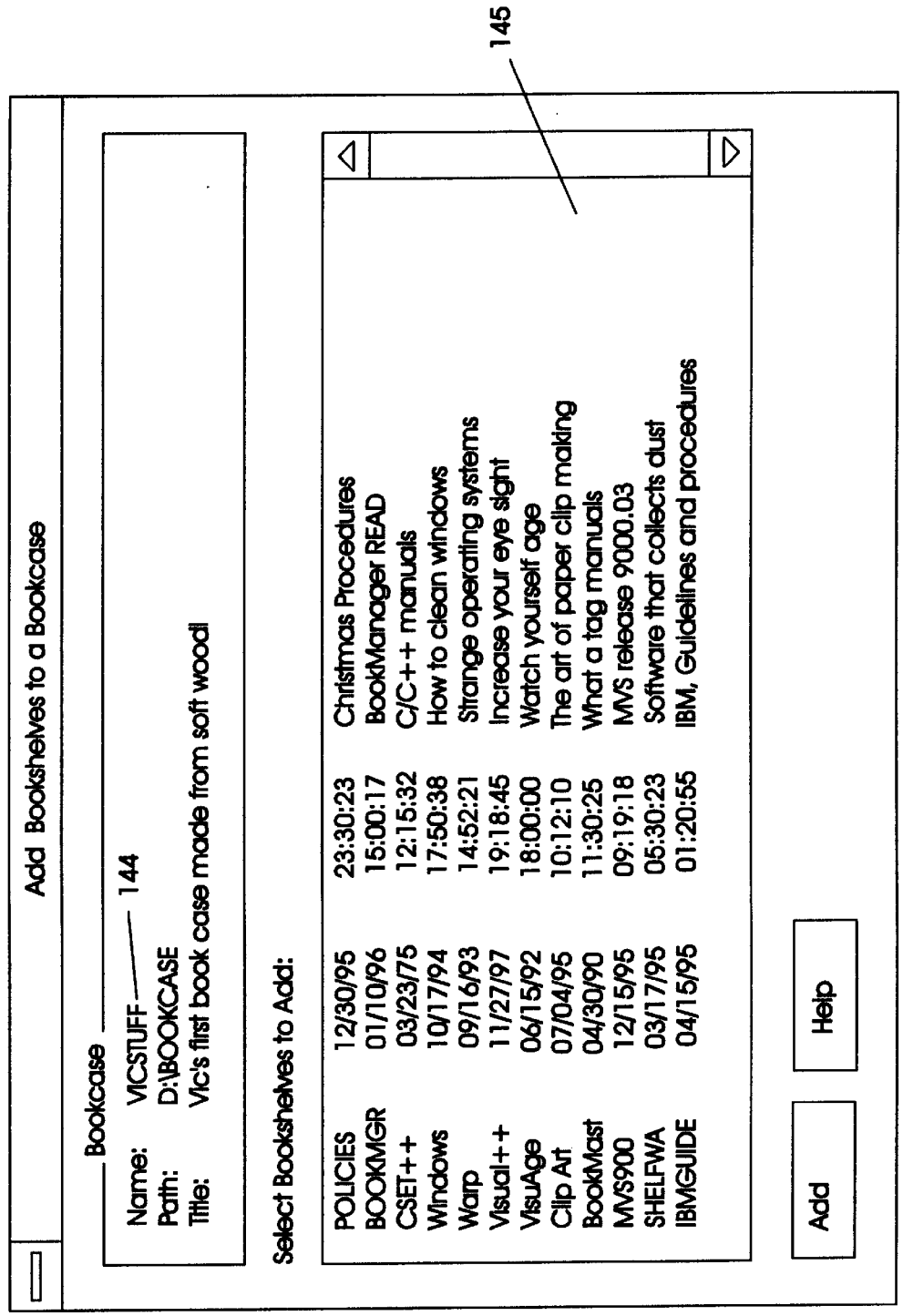
FIG. 6 is an illustration of a dialogue box for adding bookshelves to a bookcase.

Referring to FIG. 6, having created the "VICSTUFF" bookcase 144, a user is able to select previously created bookshelves to add to the bookcase 144. By selecting individual bookshelves listed in the scrollable window 145, a bookshelf will be added to the "VICSTUFF" bookcase 144.

Figure 7:
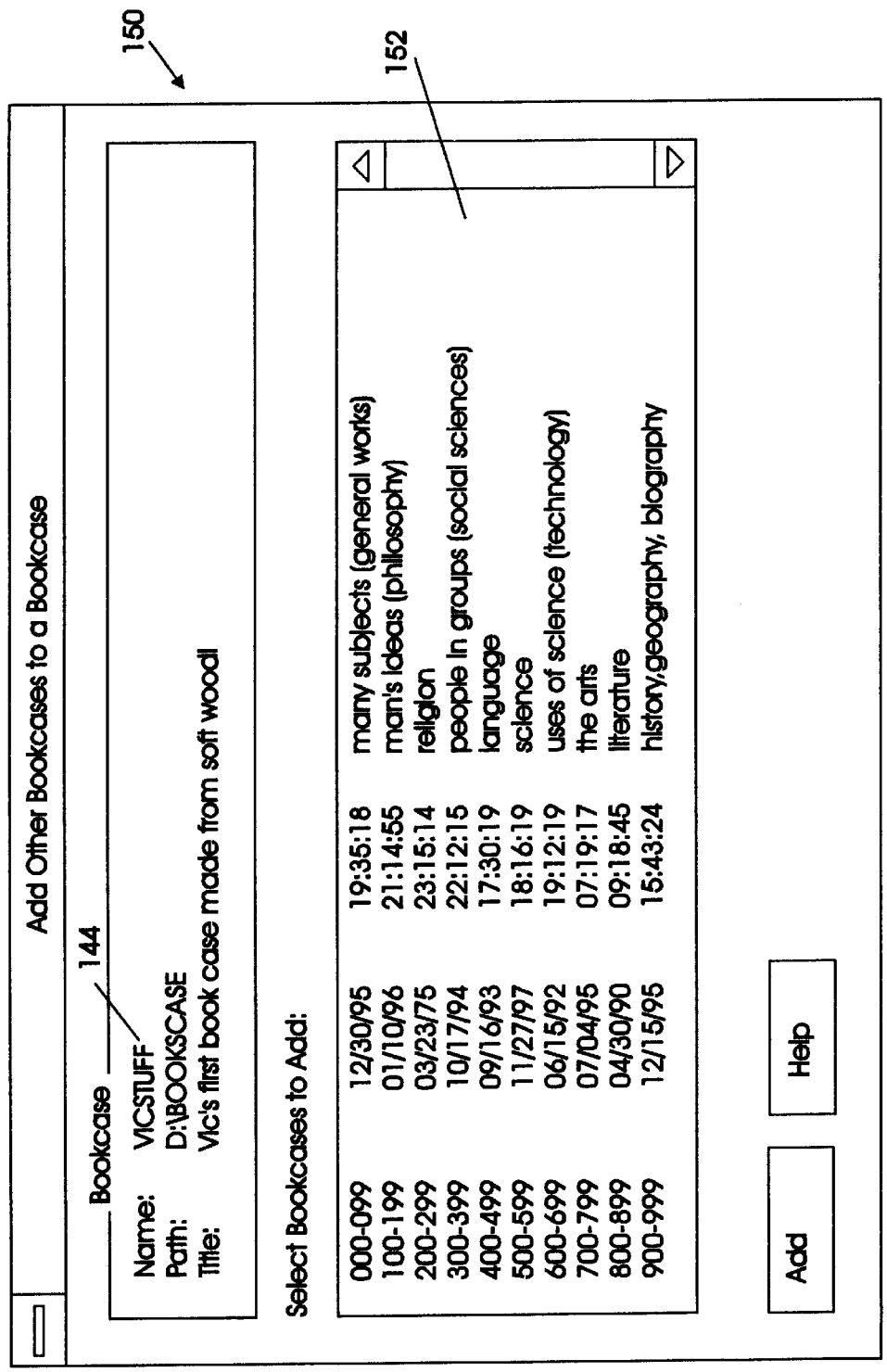
FIG. 7 is an illustration of a dialogue box for adding bookcases to a bookcase.

Referring to FIG. 7, an example of adding existing bookcases to a bookcase to create nested bookcases is shown in window 150. Again, by selecting a bookcase listed in the scrollable window 152, a pre-existing bookcase will be added to the "VICSTUFF" bookcase 142. Bookcases may contain an unlimited number of levels.

Figure 8:
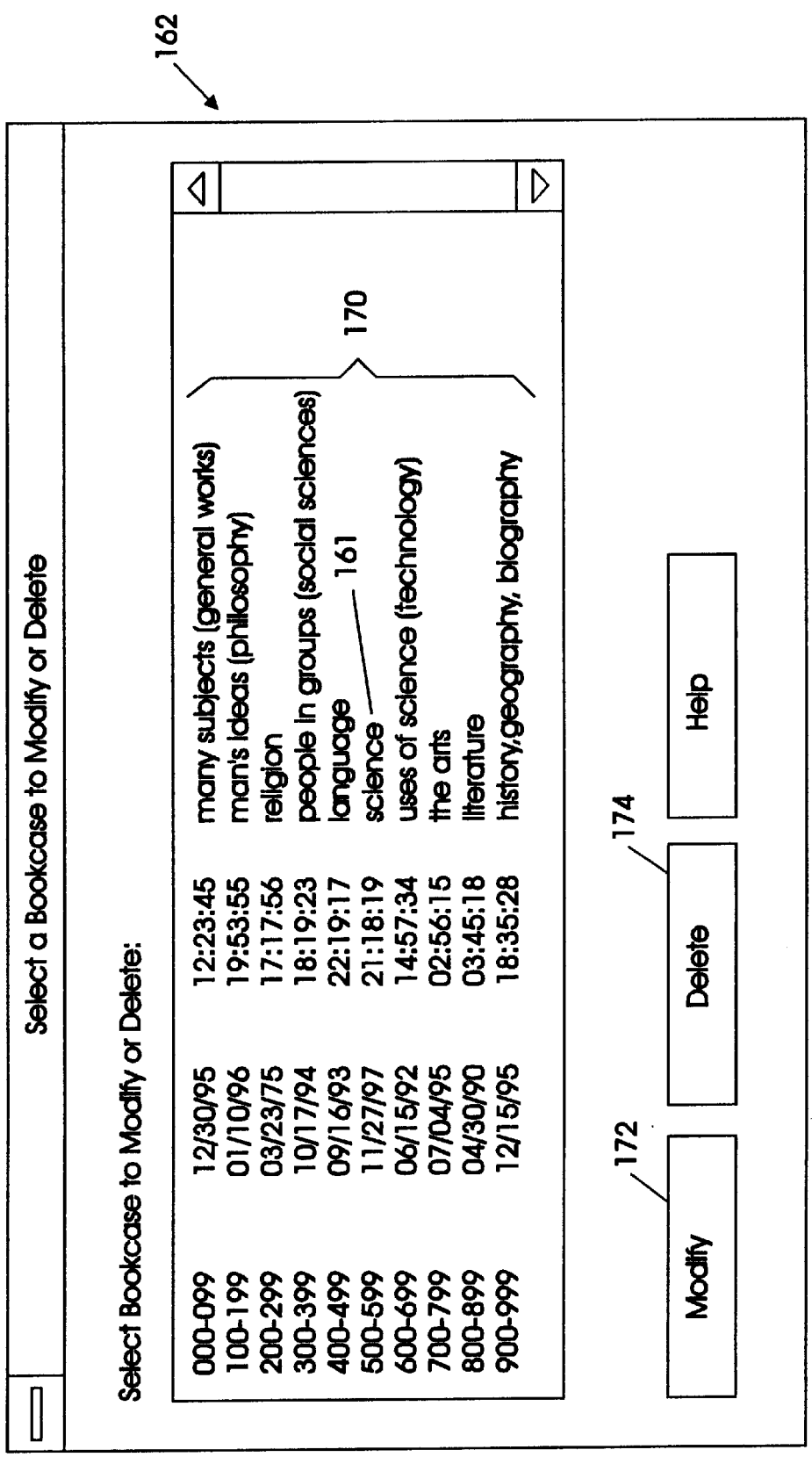
FIG. 8 is an illustration of a dialogue box to modify a bookcase.
Figure 9:
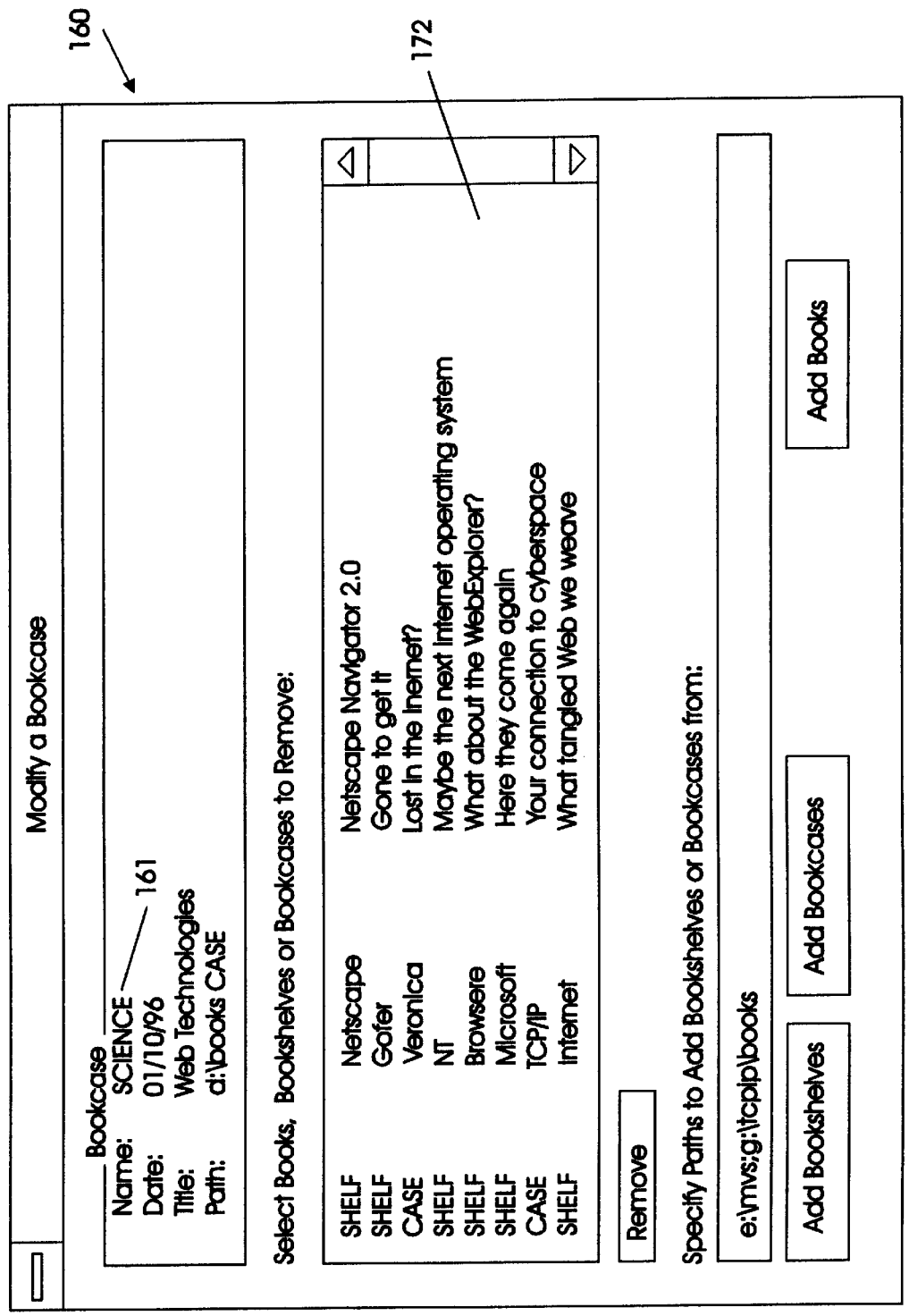
FIG. 9 is an illustration of a dialogue box to modify or delete a bookcase.

Referring to FIGS. 8 and 9, there is shown an example of modifying or deleting bookcases. In FIG. 8, a list 170 of all pre-existing bookcases in the list 170, an operator may select a "modify" control 172 or a "Delete" control 174. Obviously, if the "Delete" control 174 is selected, the designated bookcase will be deleted from the list 170. However, it is important to note that although the bookcase is deleted, none of the books or bookshelves that previously were found in that bookcase are deleted from wherever they reside. Only the link from the present invention's bookcase to the book or bookshelf is deleted.

If the "Modify" control 172 is selected, a "Modify a Bookcase" window 160, as shown in FIG. 9, will appear ("SCIENCE" bookcase 161 having been selected for modification). The user is then able to select pre-existing books, bookshelves or bookcases as listed in scrollable window 172 for removal from the "SCIENCE" bookcase 161. Alternatively, the user may specify a path from which to add bookshelves, bookcases or books to the "SCIENCE" bookcase 161.

As an example, IBM BookManager BookServer for WWW for OS/2 enables customers to provide entire libraries of documents via the Internet/Intranet. The BookServer product can serve information to HTML browsers connected to the World Wide Web, or their own internal corporate networks. This information is stored in a virtual library which is comprised of books, bookshelves, and sets of books/bookshelves called bookcases. The book metaphor provides an easy to understand and intuitive model for a user who may not be familiar with on-line viewing tools. BookServer provides fuzzy, Boolean and morphological full-text searching across entire documents and across all books in a bookshelf, not just the currently loaded HTML file. A single server can serve bookcases from its own or from multiple file storage via remote systems. The actual location is not part of the URL of a document and is transparent to the user. Bookcases can be viewed across the Web or by LAN connected workstations on multiple platforms from the same library. Bookcases can be created from bookcases, bookshelves, and books that do not physically reside together in the same path, drive or machine. The bookcase is a logical grouping that is portable across workstation platforms, and it allows access to books without having to know where the book is physically stored.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of organizing on-line electronic documents in an on-line computer system library, wherein a local data processing system has access to electronic books stored in a plurality of storage devices associated with data processing systems remote from the local data processing system, comprising the steps of:

designating a name for a bookcase stored in a local storage device of the local data processing system;

storing links to electronic books stored in remote storage devices, wherein the links are stored in the local storage device of the local data processing system;

displaying objects in said bookcase on a local display device of the local data processing system to represent said electronic books stored in said remote storage devices;

accessing said books stored in said remote storage devices by selecting said objects displayed in said bookcase so as to cause the local data processing system to access the storage device of the remote data processing system associated with a selected object displayed on the local display device so as to to obtain information from an electronic book corresponding to the selected one of the objects, and displaying the obtained information from the electronic book corresponding to the selected one of the objects on the local display.

2. The method of claim 1, further comprising the step of: storing a plurality of bookcases within said bookcase.

3. The method of claim 1, wherein said step of linking further comprises:

linking said book to a plurality of bookcases created by said step of designating, wherein said book is accessible from each of said bookcases.

4. A system for organizing electronic documents in an on-line library, comprising:
- a local data processing system, wherein the local data processing system comprises:
  - a local storage device;
  - a local display device; and
  - local communication means for communicating with other data processing systems;
- a plurality of remote data processing systems, wherein each remote data processing system comprises:
  - a remote storage device; and
  - remote communication means for communicating with other data processing systems;
- means for designating a name for a bookcase, said bookcase being stored in the local storage device;
- means for storing in the local storage device, links to electronic books stored in the remote storage devices;
- means for displaying objects in said bookcase on the local display device to represent said electronic books stored in said remote storage devices;
- means for accessing said books stored in said remote storage device by selecting said objects displayed in said bookcase so as to cause the local communication means of the local data processing system to access the remote communication means of a remote data processing system associated with an electronic book corresponding to a selected one of the objects so as to access the storage device of the remote data processing system to obtain information from the electronic book; and
- means for displaying the obtained information from the electronic book corresponding to the selected on of the objects on the local display device.

5. The system of claim 4, further comprising:
means for storing a plurality of bookcases within said bookcase.

6. The system of claim 4, wherein said means for linking further comprises:

means for linking said book to a plurality of bookcases created by said means for designating, wherein said book is accessible from each of said bookcases.

7. A computer program product recorded on computer readable medium for organizing electronic documents in an on-line library, wherein at least one local data processing system has access to electronic books stored in a storage device associated with a plurality of data processing systems remote to the local data processing system, comprising:
- computer readable means for designating a name for a bookcase, said bookcase being stored in a local storage device of the local data processing system;
- computer readable means for storing links to electronic books stored in remote storage devices wherein the links are stored in the local storage device associated with the local data processing system;
- computer readable means for displaying objects in said bookcase on a local display device of the local data processing system to represent said electronic books stored in said remote storage devices;
- computer readable means for accessing said books stored in said remote storage devices by selecting said objects displayed is said bookcase so as to cause the local data processing system to access a storage device of a remote data processing system associated with a selected object to obtain information from an electronic book associated with the selected object; and
- computer readable means for displaying the obtained information from the electronic book on the local display.

8. The computer program product of claim 7, further comprising:
computer readable means for storing a plurality of bookcases within said bookcase.

9. The computer program product of claim 7, wherein said computer readable means for linking further comprising:
computer readable means for linking said book to a plurality of bookcases created by said computer readable means for designating, wherein said book is accessible from each of said bookcases.

* * * * *